United States Patent Office
2,768,187
Patented Oct. 23, 1956

2,768,187

PROCESS FOR PRODUCING $\Delta^{8,9}$-7-KETO-11-HYDROXY STEROIDS

Leopold Ruzicka, Hans Heusser, and Oskar Jeger, Zurich, Switzerland, assignors to Ciba Pharmaceutical Products, Inc., Summit, N. J.

No Drawing. Application December 13, 1951,
Serial No. 261,582

Claims priority, application Switzerland
December 22, 1950

5 Claims. (Cl. 260—397.1)

The present invention is concerned with a new process leading to new compounds which make it possible to synthesize therapeutically active steroids containing oxygen in the 11-position.

The steroids with oxygen in 11-position are of great importance. An important representative of this class of compounds is for example cortisone, $\Delta^4$-3,11,20-trioxo-17α,21-dihydroxy-pregnene. The hitherto known processes for the synthetic production of such steroids use as starting materials desoxycholic acid and its derivatives, that is to say compounds which possess a hydroxyl group in 12-position. It has been shown however that the transfer of oxygen from the 12- to the 11-position is a very tedious process requiring several operations. In addition the desoxycholic acid used as starting material is only obtainable in relatively limited quantity, so that for example it is practically impossible to manufacture the cortisone required in therapy in sufficient quantity by this method. A requirement therefore exists for new sources for the manufacture of this medicament. The easily available sterols, such as ergosterol, stigmasterol or sitosterol, but more especially cholesterol, have indeed for many years been important starting materials for the production of sex hormones. They have however hitherto been without importance for the production of compounds with oxygen in the 11-position of the intact steroid structure.

The present invention is based on the observation that by starting from the above-mentioned sterols or conversion products thereof, compounds of the steroid series with oxygen in the 11-position can be obtained, when a $\Delta^{7,8:9,11}$-steroid is treated with an agent capable of introducing oxygen, the resultant $\Delta^{7,8}$-9,11-oxido compound is isomerized, an oxidizing agent is caused to act on the $\Delta^{8,9}$-7,11-dihydroxy-compound formed, the resultant $\Delta^{8,9}$-7-oxo-11-hydroxy-steroid is treated with a hydrogenating agent and the oxo-group in 7-position is removed by reduction.

The process is illustrated by the following diagram of partial formulae:

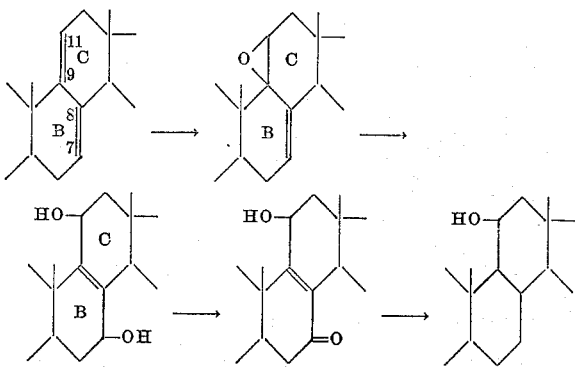

An object of the present invention are $\Delta^{8,9}$-7-oxo-11-hydroxy-steroids. These compounds are new and are intended for use as intermediate products for the preparation of 11-oxo-steroids and 11-hydroxy-steroids. Thus, e. g., the present invention is a step in the preparation of 3α-acetoxy-11-oxo-cholanate (see e. g. Example 5 of copending application S. N. 261,581, filed on even date herewith) which is a recognized and well known intermediate for the production of the highly active hormone 11-dehydro-corticosterone (cf. Wettstein & Meystre: Helv. Chim. Acta, vol. 30, p. 1261–1265 (1947)). Another object of the invention is a process for the manufacture of $\Delta^{8,9}$-7-oxo-11-hydroxy-steroid. It comprises treating a $\Delta^{8,9}$-7,11-dihydroxy-steroid with a member selected from the group of tertiary butylchromate and bromosuccinimide.

These $\Delta^{8,9}$-7,11-dihydroxy-steroids belong to the cyclopentanopolyhydrophenanthrene or the polyhydrochrysene series. Particular importance is attached to the derivatives of cholestane, coprostane, sitostane, stigmastane, cholane, allocholane, pregnane, androstane and etiocholane. In addition to the aforementioned double bond, the starting materials may have other double bonds. They can be obtained, e. g. according to copending U. S. patent application Serial No. 261,578, filed December 13, 1951, by isomerizing $\Delta^{7,8}$-9,11-oxido-steroids with acids under mild conditions.

For the oxidation according to the invention, tertiary butylchromate or bromosuccinimide are used in the presence of a diluent, such as an organic solvent, e. g. a halogenated hydrocarbon, especially carbon tetrachloride.

The following examples illustrate the invention, the relation between parts by weight and parts by volume being the same as that between the gram and the cubic centimeter:

Example 1

0.22 part by weight of crude $\Delta^{8,9}$-7,11-dihydroxy-3β,17β-diacetoxy-androstene of melting point 208–210° C. (prepared according to U. S. patent application Serial No. 261,578, filed December 13, 1951) is dissolved in 2.5 parts by volume of carbon tetrachloride. 0.5 part by volume of a solution of tertiary butyl chromate, which had been prepared from 0.093 part by weight of chromium trioxide and freed from excess tertiary butanol, is added to the above solution while cooling with ice and stirring. The stirring is continued at 0° C. for half an hour and then at room temperature for 4½ hours. The excess of the oxidizing agent is destroyed by addition of 1 part by weight of oxalic acid dissolved in 10 parts by volume of water and 2 parts by volume of 2-n sulfuric acid. The reaction mixture is diluted with 60 parts by volume of ether, the organic layer washed with water, bicarbonate and water, dried and evaporated. 0.233 part by weight of a light yellow residue is obtained, which is dissolved in methanol and the solution is concentrated to a small volume. On cooling the $\Delta^{8,9}$-3β,17β-diacetoxy-7-oxo-11-hydroxy-androstene, of melting point 190.5–192° C. separates in nice crystals. It shows in the ultraviolet spectrum an absorption maximum at 248 mμ (log ε=3.9).

Example 2

1 part by volume of powdered $\Delta^{8,9:22,23}$-3β-acetoxy-7,11-dihydroxy-ergostadiene of melting point 269–270° C. (prepared according to U. S. patent application Serial No. 261,578, filed December 13, 1951) is suspended in 100 parts by volume of carbon tetrachloride and treated with 30 parts by volume of a solution of tertiary butyl chromate in carbon tetrachloride (corresponding to 0.035 part by weight of chromic acid per part by volume). The reaction mixture is kept at —10° C. for 8 hours, then 4 parts by volume of oxalic acid dissolved in water and 10 parts by volume of 2 N-sulfuric acid are added. The reaction mixture is vigorously stirred for 1½ hours, diluted with 200 parts by volume of chloroform, the organic layer separated and washed consecutively with water, sodium bicarbonate solution and water, dried and evaporated in vacuo. The crude product is chromatographed over alumina, whereby 0.5 part by weight of $\Delta^{8,9:22,23}$-3$\beta$-acetoxy-7-oxo-11-hydroxy-ergostadiene is obtained, which can be recrystallized from a mixture of methanol and water and melts at 235° C. In the ultraviolet absorption spectrum it shows a maximum at 252 m$\mu$ (log $\epsilon$=3.98).

*Example 3*

1 part by weight of finely powdered $\Delta^{8,9:22,23}$-3$\beta$-acetoxy-7,11-dihydroxy-ergostadiene (prepared according to U. S. patent application Serial No. 261,578, filed December 13, 1951) is dissolved in a mixture of 200 parts by volume of dioxane and 40 parts by volume of water and 50 parts by weight of N-bromosuccinimide are added. The reaction mixture is kept at 20° C. for 20 hours, diluted with 400 parts by volume of water and extracted with 400 parts by volume of ether. The organic layer is separated and washed with water, sodium bicarbonate and water, dried and evaporated. The crude reaction product is chromatographed over alumina and from the crystalline fractions $\Delta^{8,9:22,23}$-3$\beta$-acetoxy-7-oxo-11-hydroxy-ergostadiene of melting point 235° C. is obtained.

*Example 4*

0.5 part by weight of finely powdered $\Delta^{8,9}$-3$\beta$-acetoxy-7,11-dihydroxy-cholestene of melting point 228–230° C. (prepared according to U. S. patent application Serial No. 261,578, filed December 13, 1951) is suspended in 60 parts by volume of carbon tetrachloride, cooled to 0° C., and 5 parts by volume of a solution of tertiary butyl chromate in carbon tetrachloride (corresponding to 0.93 part by weight of chromic acid) slowly dropped in within 10 minutes while stirring. The reaction mixture immediately turns dark when the oxidizing agent is added and the starting material dissolves completely. The reaction mixture is stirred for 5 hours at 0° C. The excess butyl chromate is destroyed with 5 parts by weight of oxalic acid dissolved in water and the reaction worked up as described in Example 1. 0.48 part by weight of a slightly yellow oil is obtained, which is chromatographed over aluminum oxide. By this method the crystalline $\Delta^{8,9}$-3$\beta$-acetoxy-7-oxo-11-hydroxy-cholestene is obtained, which can be recrystallized from ethanol or from a mixture of acetone and water. It exhibits strong absorption in the ultraviolet absorption spectrum at 250 m$\mu$ (log $\epsilon$=3.96) and shows in the infra-red spectrum a sharp band at 3402 cm.$^{-1}$ typical for a free hydroxyl group in addition to the strong bands of the acetate and $\alpha,\beta$-unsaturated oxo group at 1730 cm.$^{-1}$ and 1660 cm.$^{-1}$, respectively.

*Example 5*

1.2 parts by weight of the oily methyl $\Delta^{8,9}$-3$\alpha$-acetoxy-7,11-dihydroxy-cholenate (prepared according to U. S. patent application Serial No. 261,578, filed December 13, 1951) are dissolved in a mixture of 200 parts by volume of pure dioxane and 50 parts by volume of water. To the clear and well stirred solution 60 parts by weight of N-bromo-succinimide are added. The reaction mixture is kept at room temperature for 18 hours. 450 parts by volume of water are then added and the solution extracted with 800 parts by volume of ether in 3 portions. The combined ethereal solutions are washed with water, sodium bicarbonate and again with water, dried with magnesium sulfate and evaporated. The crude reaction product is chromatographed over alumina and from the crystalline fractions methyl $\Delta^{8,9}$-3$\alpha$-acetoxy-7-oxo-11-hydroxy-cholenate is obtained. The product shows in ethanol solution an ultraviolet absorption maximum at 249 m$\mu$ (log $\epsilon$=3.9).

By using $\Delta^{8,9}$-3$\beta$,17$\beta$-diacetoxy-7,11-dihydroxy-androstene, $\Delta^{8,9}$-3$\beta$-acetoxy-7,11-dihydroxy-cholestene, $\Delta^{8,9}$-3$\beta$-20-diacetoxy-7,11-dihydroxy-allo-pregnene or $\Delta^{8,9:22,23}$-3$\beta$-acetoxy-7,11-dihydroxystigmastadiene as starting materials and by treating them with N-bromosuccinimide in an analogous manner the corresponding $\Delta^{8,9}$-7-oxo-11-hydroxy-steroids can be produced.

*Example 6*

0.8 part by weight of crude $\Delta^{8,9}$-3$\beta$,20-diacetoxy-7,11-dihydroxy-allo-pregnene (prepared according to U. S. patent application Serial No. 261,578, filed December 13, 1951) is suspended in 100 parts by volume of carbon tetrachloride and cooled to 0° C. To the well stirred reaction mixture 8 parts by volume of a solution of tertiary butyl chromate in carbon tetrachloride (prepared from 0.298 part by weight of chromic acid and freed from excess tertiary butanol by azeotropic distillation of the alcohol with carbon tetrachloride) are gradually added within 15 minutes. Stirring is continued at 0° C. for 6 hours, when a solution of 10 parts by weight of oxalic acid in water is added. The reaction mixture can be acidified further by addition of 5 parts by volume of 2 N-sulfuric acid to dissolve any precipitate that may have been formed. After 2½ hours the mixture is diluted with ether, the organic layer separated, washed with water, sodium bicarbonate and water, dried and evaporated. It is to be recommended to chromatograph the crude reaction product over aluminum oxide. From the crystalline fractions pure $\Delta^{8,9}$-3$\beta$,20-diacetoxy-7-oxo-11-hydroxy-allo-pregnene is obtained. In the infra-red spectrum it shows a very strong band at 1710 cm.$^{-1}$ and a weaker band at 1780 cm.$^{-1}$, which are assigned to the acetate carbonyl and $\alpha,\beta$-unsaturated carbonyl group, and in addition a fairly sharp band at 3410 cm.$^{-1}$ indicating a free hydroxyl group.

If the tertiary butyl chromate is caused to react on methyl $\Delta^{8,9}$-3$\alpha$-acetoxy-7,11-dihydroxy-cholenate in an analogous way methyl $\Delta^{8,9}$-3$\alpha$-acetoxy-7-oxo-11-hydroxy-cholenate is obtained.

What is claimed is:

1. A process for the conversion of a member selected from the group consisting of $\Delta^{8,9}$-3-lower alkylcarbonyloxy-7,11-dihydroxy-androstenes, $\Delta^{8,9}$-3-lower alkylcarbonyloxy-7,11-dihydroxyergostadienes, $\Delta^{8,9}$-3-lower alkylcarbonyloxy-7,11-dihydroxy-cholestenes, $\Delta^{8,9}$-3-lower alkylcarbonyloxy-7,11-dihydroxy-cholenes, $\Delta^{8,9}$-lower alkylcarbonyloxy-7,11-dihydroxy-allopregnenes and $\Delta^{8,9}$-3-lower alkylcarbonyloxy-7,11-dihydroxystigmastadienes into the corresponding 7-oxo-11-hydroxy-compound, which comprises treating the said member of the said group with a member selected from the group consisting of tertiary butyl chromate and N-bromosuccinimide.

2. A process for the conversion of a lower alkyl $\Delta^{8,9}$-3-lower alkylcarbonyloxy-7,11-dihydroxy-cholenate to the corresponding lower alkyl $\Delta^{8,9}$-3-lower alkylcarbonyloxy-7-oxo-11-hydroxy-cholenate, which comprises treating the lower alkyl $\Delta^{8,9}$-3-lower alkylcarbonyloxy 7,11-dihydroxy-cholenate with N-bromosuccinimide.

3. A process for the conversion of a lower alkyl $\Delta^{8,9}$-3-acetoxy-7,11-dihydroxy-cholenate to the corresponding lower alkyl $\Delta^{8,9}$-3-acetoxy-7-oxo-11-hydroxy-cholenate, which comprises treating the lower alkyl $\Delta^{8,9}$-3-acetoxy-7,11-dihydroxy-cholenate with tertiary butyl chromate in carbon tetrachloride solution.

4. A process for the conversion of methyl $\Delta^{8,9}$-3$\alpha$-acetoxy-7,11-dihydroxy-cholenate to the corresponding methyl $\Delta^{8,9}$-3$\alpha$-acetoxy-7-oxo-11-hydroxy-cholenate, which comprises treating the methyl $\Delta^{8,9}$-3$\alpha$-acetoxy-7,11-dihydroxy-cholenate with N-bromosuccinimide.

5. A process for the conversion of methyl $\Delta^{8,9}$-3$\alpha$-acetoxy-7,11-dihydroxy-cholenate to the corresponding methyl $\Delta^{8,9}$-3$\alpha$-acetoxy-7-oxo-11-hydroxy-cholenate, which comprises treating the methyl $\Delta^{8,9}$-3α-acetoxy-7,11-dihydroxy-cholenate with tertiary butyl chromate in carbon tetrachloride solution.

References Cited in the file of this patent

UNITED STATES PATENTS 2,569,300   Fieser et al. _____ Sept. 25, 1951

OTHER REFERENCES

Fieser et al.: Natural Products Related to Phenanthrene, 3rd ed., page 425 (1949).